US006076325A

United States Patent [19]

Sluiter

[11] Patent Number: 6,076,325

[45] **Date of Patent: *Jun. 20, 2000**

[54] METAL TRUSS JOINING GUSSET

[76] Inventor: Scott E. Sluiter, 4900 168th Ave., Holland, Mich. 49424

[ * ] Notice: This patent is subject to a terminal disclaimer.

[21] Appl. No.: 09/094,197

[22] Filed: Jun. 9, 1998

Related U.S. Application Data

[63] Continuation of application No. 08/752,688, Nov. 19, 1996, Pat. No. 5,806,265.

[60] Provisional application No. 60/010,584, Jan. 25, 1996.

[51] Int. Cl.[7] .......................................................... E04C 3/02

[52] U.S. Cl. ............................. 52/655.1; 52/643; 52/690; 52/696; 52/702; 52/712; 403/258; 403/262; 403/403

[58] Field of Search .................................... 52/655.1, 690, 52/696, 643, 702, 712, 745.2; 403/237, 403, 256, 258, 262; 248/300; 211/182, 189

[56] References Cited

U.S. PATENT DOCUMENTS

| | | |
|---|---|---|
| D. 364,331 | 11/1995 | Leek . |
| 508,280 | 11/1893 | Cavallaro . |
| 528,940 | 11/1894 | Greiner . |
| 792,366 | 6/1905 | Taylor . |
| 1,778,854 | 10/1930 | Green . |
| 1,819,970 | 8/1931 | Peden . |
| 1,896,530 | 2/1933 | Trout . |
| 2,300,113 | 10/1942 | Faber . |
| 2,353,039 | 7/1944 | Janiszewski . |
| 2,477,163 | 7/1949 | Barnett . |
| 2,611,160 | 9/1952 | Hanesse . |
| 2,994,415 | 8/1961 | Halle . |
| 3,358,848 | 12/1967 | Johnsson . |
| 3,425,720 | 2/1969 | Spane . |
| 3,481,635 | 12/1969 | Tracy . |
| 3,596,941 | 8/1971 | Tracy . |
| 4,196,556 | 4/1980 | Russo . |
| 4,318,628 | 3/1982 | Mancini . |
| 4,389,829 | 6/1983 | Murphy . |
| 4,410,294 | 10/1983 | Gilb et al. . |
| 4,422,792 | 12/1983 | Gilb . |
| 4,435,940 | 3/1984 | Davenport et al. . |
| 4,498,801 | 2/1985 | Gilb . |
| 4,525,971 | 7/1985 | Kern . |
| 4,561,230 | 12/1985 | Rionda et al. . |
| 4,616,453 | 10/1986 | Sheppard, Jr. et al. . |
| 4,715,161 | 12/1987 | Carraro et al. . |
| 4,748,784 | 6/1988 | Dividoff et al. . |
| 4,817,359 | 4/1989 | Colonias . |
| 4,837,988 | 6/1989 | Menchetti et al. . |
| 4,878,323 | 11/1989 | Nelson . |
| 4,897,979 | 2/1990 | Colonias . |
| 4,982,545 | 1/1991 | Stromback . |
| 4,986,052 | 1/1991 | Nelson . |
| 5,253,465 | 10/1993 | Gilb . |
| 5,263,296 | 11/1993 | Spera . |
| 5,341,619 | 8/1994 | Dunagan et al. . |
| 5,438,811 | 8/1995 | Goya . |
| 5,617,694 | 4/1997 | Baba . |
| 5,806,265 | 9/1998 | Sluiter ...................................... 52/643 |

FOREIGN PATENT DOCUMENTS

| | | |
|---|---|---|
| 18355 | 6/1975 | Australia . |

*Primary Examiner*—Robert Canfield

*Attorney, Agent, or Firm*—Price, Heneveld, Cooper, DeWitt & Litton

[57] ABSTRACT

A gusset for joining first and second abutting support trusses wherein the gusset comprises a plate having a body portion and a finger portion. The body portion is adapted to be abutted against and fastened to a side of the first support truss at one end thereof and the finger portion is adapted to extend beyond the end of the first truss when the body portion is fastened to the first support truss. The finger portion is further adapted to hangingly engage at least one element of the second support truss for supporting the one end of the first truss thereon without fastening the first truss to the second truss.

13 Claims, 2 Drawing Sheets

2
2
6
10
6
10
6
1
4

10
16
15
19
11
17
12
18
13
14

21
31
37
24
38
10
12
20
30
32
23
30
35
34
14
23
22
33
33

METAL TRUSS JOINING GUSSET

CROSS REFERENCE TO RELATED APPLICATIONS

The present application is a continuation of commonly owned U.S. patent application Ser. No. 08/752,688, filed Nov. 19, 1996, U.S. Pat. No. 5,806,265, entitled "TRUSS JOINING GUSSET," which claims the benefit of U.S. Provisional Application Ser. No. 60/010,584, filed Jan. 25, 1996.

BACKGROUND OF THE INVENTION

Structural trusses are used for the fabrication of buildings in the construction industry. The primary application of structural trusses is to define a desired roof line and to support the roof by the building walls and interior structure. Trusses are typically fashioned from a series of joined vertical, horizontal, and angled members. Historically, trusses have been fabricated from wooden members joined by flat metal plates having a plurality of spiked projections therefrom for driving the plates into the wooden members and retaining the members in a joined relationship.

In recent years, metal trusses have gained favor in the construction industry. Metal trusses are typically comprised of metal U-channels and square tubular members with the members being joined by mechanical fasteners.

When added to a building structure, metal trusses are primarily in a parallel spaced apart relationship. However, for hipped roofs or roofs of multiple roof lines and the like, secondary trusses are required for attachment to the primary trusses to give the desired roof lines. The secondary trusses are joined to the primary trusses by abutting the secondary truss to the primary truss and manually holding the truss in place while angled clips are fastened to the trusses to join the various horizontal or vertical truss members. In practice, mechanical fasteners are installed through each flange of the angled clips thereby resulting in load transference between trusses via fasteners which are installed essentially at right angles to each other. This method of joining trusses results in the undesired inducement of bending movements in the flanges of the angled clips, misalignment of secondary trusses with respect to the primary trusses, and lateral movement and play between trusses as roof loads are applied.

SUMMARY OF THE INVENTION

In the present invention, a gusset is provided for joining trusses wherein the gusset has a body portion for attachment to a first truss and a finger for engaging a flange of a second truss to support the end of the first truss on the second truss until the first truss is permanently fastened to the second truss. This eliminates the need to independently support the first truss in relative position to the second truss while permanently fastening the first truss to the second truss.

DESCRIPTION OF PREFERRED EMBODIMENT

Figures 1, 2, 3:
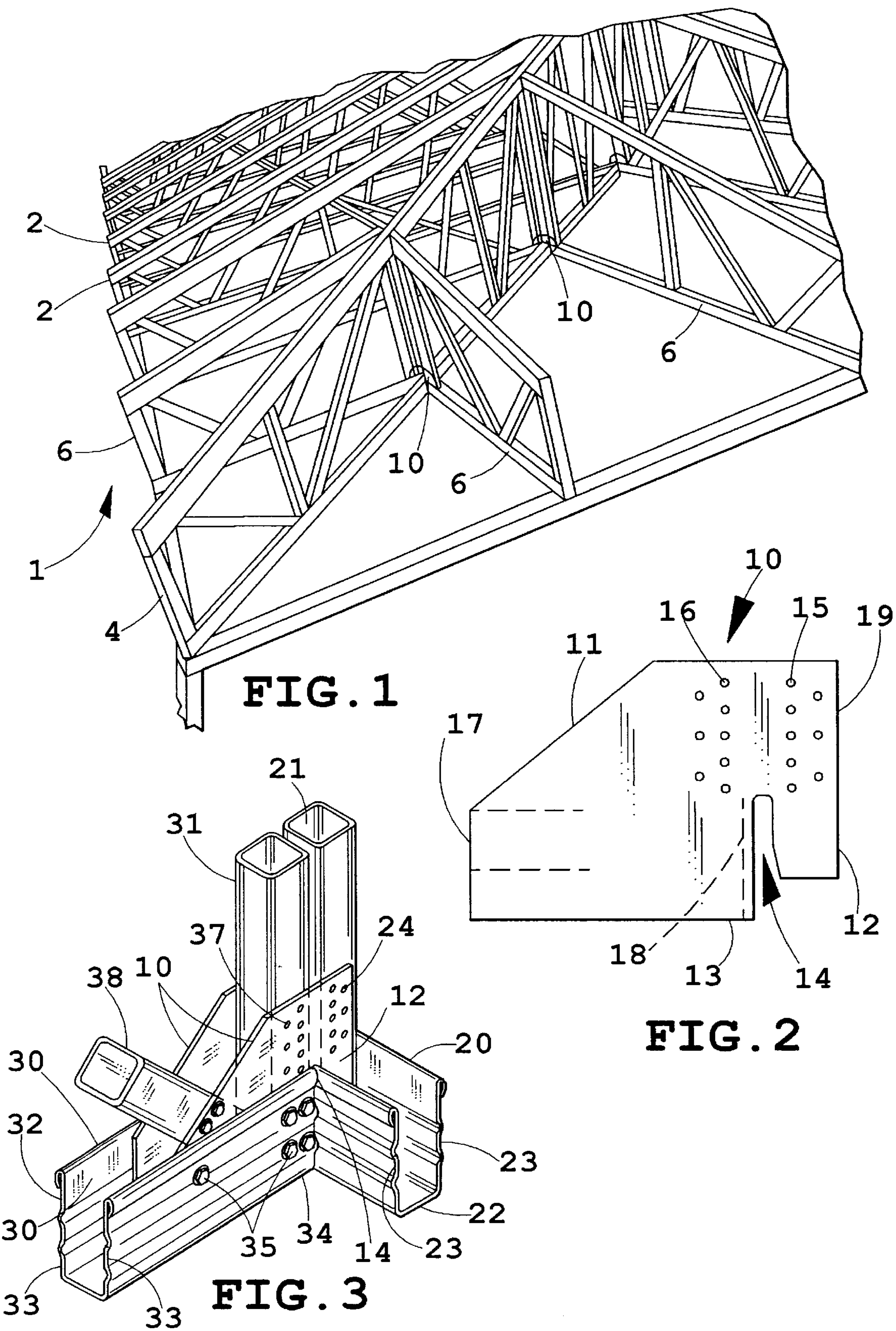
FIG. 1 is a perspective view of a plurality of trusses arranged to support a roof wherein secondary trusses are joined to primary trusses according to the present invention.
FIG. 2 is a plan view of a metal truss joining gusset for joining metal trusses at substantially right angles.
FIG. 3 is a sectional perspective view of a truss joint showing a metal truss joining gusset attaching a secondary metal truss to a primary metal truss.

For purposes of description herein, the terms "upper," "lower," "right," "left," "rear," "front," "vertical," "horizontal," and derivatives thereof shall relate to the invention as oriented in FIGS. 2 and 3. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Within this description, members of a truss referred to as chords are those horizontal or near horizontal members forming the bottom of the truss and those angled upper members defining a roof line. The truss members extending between chords and maintaining the chords in a spaced apart relationship are referred to as webs.

Turning to the drawings, FIG. 1 shows a network of trusses shown generally at 1. Primary trusses 2 are generally supported at the ends of the truss by the exterior supporting walls, and, depending upon the internal configuration of a building, the trusses may also be supported at an intermediate point depending upon the internal configuration of the building. Often times, the roof lines of buildings incorporate either multiple roof lines or hipped roofs thereby requiring trusses other than primary trusses to facilitate the alternate roof lines. In creating the multiple roof lines such as the hipped roof shown in FIG. 1, a secondary truss 4 is attached to a primary truss 2 and is oriented at an angle with respect to primary truss 2 to form the desired roof line. Additionally, secondary truss 4 may also act as t primary truss to secondary trusses 6 to complete the truss network for a particular roof. Secondary trusses 6 are mated and attached to truss 4 with gussets 10 positioned at a lower end portion of secondary truss 6 at the point where secondary truss 6 abuts against primary truss 4. Depending on the configuration of the desired roof lines, the secondary trusses may be mated with the primary truss 4 at either right angles or at an angle other than 90° to form the desired roof line.

Referring to FIG. 2, the preferred embodiment of the present invention discloses a gusset 10 comprising a flat metal plate 11 having a finger 12, a depending portion 13, a forward end 17 and an upper portion 19. Depending portion 13 and upper portion 19 generally forming a body of the gusset. Finger 12 and depending portion 13 combine to define slot 14 therebetween. The width of slot 14 is slightly greater than the thickness of upstanding flanges 23 of bottom chord 22 of truss 20 to which gusset 10 is to be mated, and the depth of slot 14 is substantially equal to the length of upstanding flange 23 (FIG. 3). Bottom chord 22 is in the general shape of a U-channel. Gusset 10 has a first hole series 15 in upper portion 19 located substantially in vertical alignment with finger 12. A second hole series 16 is also located in upper portion 19 forward of and in substantially horizontal alignment with hole series 15 and is substantially horizontally equi-distant from slot 14 as is holes series 15. The number of holes in series 15 and series 16 is dependent on the force loads to be transferred between trusses and is therefore application dependent; however, the number of holes in series 15 is typically equal to the number of holes in series 16.

In FIG. 3, two gussets 10 are shown in use joining secondary truss 30 to primary truss 20. Secondary truss 30 is typically comprised of bottom chord 32 in the shape of a U-channel having upstanding flanges 33 and terminating at butt end 34. Co-located at butt end 34 is web 31 typically formed in a square tubular cross-section. Web 31 rests within the U-shaped channel of bottom chord 32. Gussets 10 flank the outer sides of web 31 and also flank the inner sides 36 of upstanding flanges 33 on bottom chord 32 of secondary truss 30. Gusset 10 is attached to secondary truss 30 with fasteners 37 through second hole series 16; fasteners 37 engage both truss web 31 and gusset 10. Similarly, holes are formed through both bottom chord 32 and gusset 10 with fasteners 35 installed therethrough affixing portion 13 of gusset 10 to upstanding flange 33 of bottom chord 30. The number of fasteners 35 again depending on the force loads exerted on trusses 20 and 30. Gusset 10 is formed in a manner such that an angular web 38 extending from the approximate intersection of bottom chord 32 and web 31 can also be attached to gusset 10.

At such time as secondary truss 30 is desired to be joined to primary truss 20, secondary truss 30 is manually positioned relative to primary truss 20 so that butt end 34 of secondary truss 30 is abutted against primary truss 20 and each of gusset plates 10 flank vertical member 21 of primary truss 20. Secondary truss 30 is vertically lowered so that slots 14 in gussets 10 engage the upstanding flange 23 in bottom chord 22 most proximate to secondary truss 30. When flange 23 is fully engaged within slots 14, fingers 12 of gussets 10 extend into the U-section of bottom chord 22, thereby retaining secondary truss 30 in proper registration with primary truss 20 and alleviating the need to manually support secondary truss 30 while attaching secondary truss 30 to primary truss 20. Holes are formed in web 21 in registration with holes 15 and fasteners 24 are thereby installed in holes 15 for permanent attachment of secondary truss 30 to primary truss 20.

Figure 4:
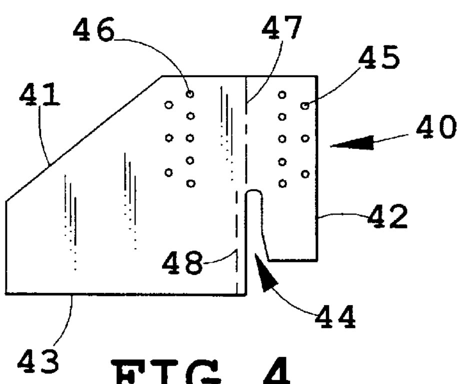
FIG. 4 is an alternate embodiment of the gusset for joining a secondary truss to a primary truss at an angle other than 90°.
Figure 5:
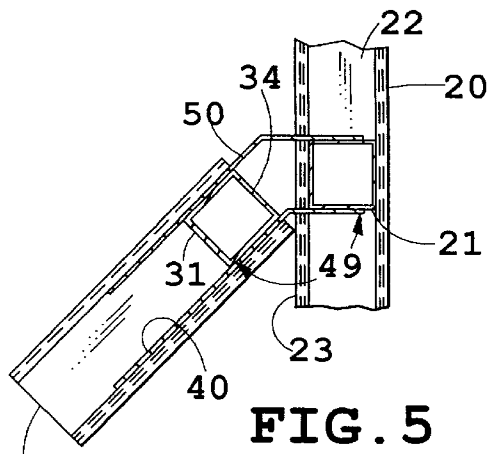
FIG. 5 is a plan view of the gusset joining a secondary truss to a primary truss at an angle other than 90°.

An alternate embodiment 40 of truss joining gusset 10 is shown in FIGS. 4 and 5 whereby gusset 40 is formed in a manner similar to gusset 10 such that plate 41 is bent along bend line 47. Finger 42, and holes series 45 are no longer co-planar with depending portion 43 and holes series 46. Mark line 48 is stamped on at least one side of gusset 40 slightly forward of slot 44 and parallel thereto. In the preferred embodiment, mark line 48 is approximately 3/16 inch forward of slot 44. In use, gusset 40 is mounted to secondary truss 30 in a manner similar to gusset 10 with butt end 34 horizontally aligned with mark line 48 on gusset 40. The purpose of gusset 40 is to mount secondary truss 30 to primary truss 20 at an angle other than 90° and corresponding to angle 49 formed in gusset 40 at bend line 47. Gusset 50 is formed in the same manner as gusset 40; however, the bend line for gusset 50 and the hole series for mounting gusset 50 to web 31 are located farther forward on gusset 50 to accommodate for the geometry of mounting secondary truss 30 to truss 20 at the other than 90° angle. After installation of gussets 40 and 50 on secondary truss 30, slot 44 in gusset 40 and a corresponding slot in gusset 50 and hole series 45 in gusset 40 and the corresponding holes series in gusset 50 are all in alignment to permit engagement of the slots in gussets 40 and 50 with the flange 23 on primary truss 20 and to permit gussets 40 and 50 to flank web 21. Gussets 40 and 50 are then fastened to web 21 in the same manner as gusset 10.

Figure 6:
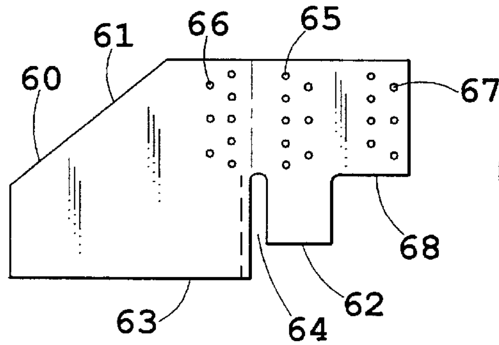
FIG. 6 is an alternate embodiment of the gusset joining a secondary truss to a primary truss and to a second truss adjacent and parallel to the primary truss.

A third embodiment 60 of truss joining gusset 10 is shown in FIG. 6 whereby gusset 70 is formed in a manner similar to gusset 10 with the addition of tabbed portion 68 extending rearward from plate 61. Gusset 60 also has hole series 65 and 66 as does gusset 10 and has a third hole series 67 in tabbed portion 68. Hole series 67 is in substantially horizontal alignment with hole series 65 and 66 and horizontally spaced from hole series 65 to engage a second truss 70 adjacent to primary truss 20.

Figure 7:
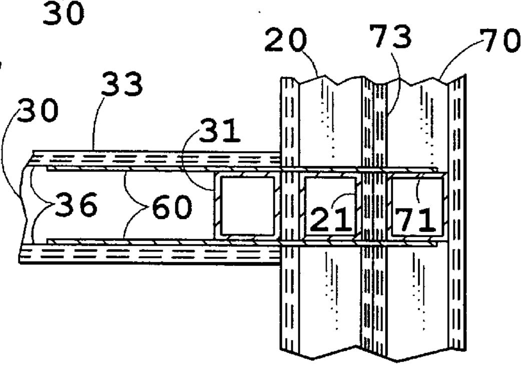
FIG. 7 is a plan view of the gusset joining a secondary truss to a primary truss and to a second truss adjacent and parallel to the primary truss.
Figure 8:
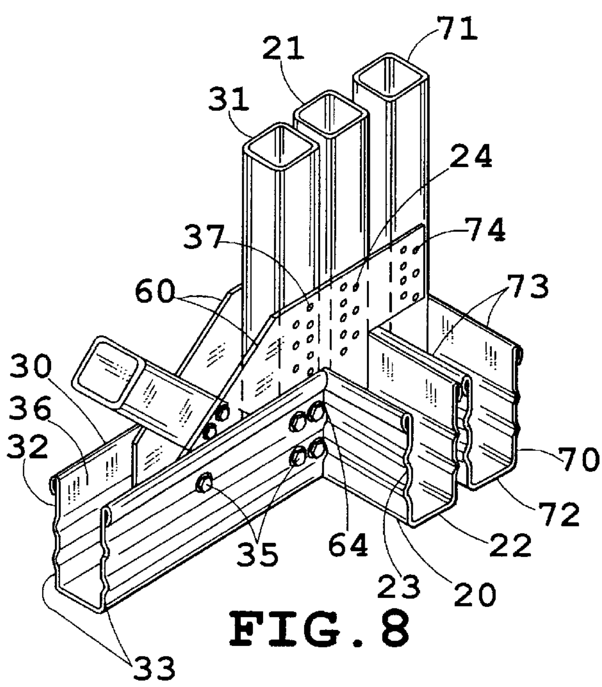
FIG. 8 is a perspective view of the embodiment of the gusset joining a secondary truss to a primary truss and to a second truss adjacent and parallel to the primary truss.
Figure 9:
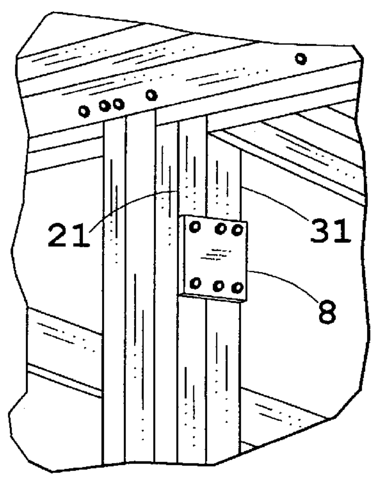
FIG. 9 is a perspective view of an upper portion of trusses joined according to the present invention wherein the upper truss portions are joined with splice plates.

Referring to FIGS. 6–8, gusset 60 is shown in use in joining secondary truss 30 to primary truss 20 and second primary truss 70 at substantially right angles thereto. In use, gussets 60 flank web 31 in secondary truss 30 and are fastened thereto by fasteners 37. Depending portion 63 of gusset 60 flank interior surface 36 of vertical flanges 33 and are fastened thereto by mechanical fasteners 35. Secondary truss 30 is then abutted to primary truss 20 and vertically lowered until vertical flange 23 engages slot 64 in gusset 60. Gussets 60 flank the exterior portions of webs 21 and 71 in trusses 20 and 70 respectively. Holes are then formed in webs 21 and 71 corresponding to and in registration with hole series 65 and hole series 67 in gussets 60. Gussets 60 are then affixed to webs 21 and 71 with fasteners 24 and 74 respectively.

As illustrated in FIG. 8, in addition to the gusset, such as gusset 10, affixing the lower portion of a secondary truss 30 to a primary truss 20 as shown in FIG. 3, a splice plate can be attached to the sides of webs 31 and 21 and affixed in place with fasteners to maintain secondary truss 30 in a desired vertical relationship with respect to primary truss 20.

In the foregoing description, it will be readily appreciated by those skilled in the art that modifications may be made to the invention without departing from the concept disclosed herein. Such modifications are to be considered as included in the following claims, unless these claims expressly state otherwise.

The invention claimed is:

1. A support truss adapted for joining one end thereof to a primary support at an intermediate portion of the primary support, said support truss comprising:

upper and lower chord members defining upper and lower boundaries of said support truss;

at least one web member extending between said upper and said lower chord members for supporting said chord members in a fixed relationship, said at least one web member and said upper and lower chord members lying in a generally vertical plane when said support truss is at least partially supported at said one end thereof; and two gussets at said one end of said support truss, each of said gussets abutted against and fastened to opposite sides of said support truss at said one end thereof, each of said gussets further comprising a finger portion extending beyond said one end of said support truss, said finger portion being adapted to hangingly engage the primary support for supporting said end of said support truss thereon without fastening said support truss to the primary support, said finger portions of said gussets lying in substantially vertical parallel planes relative one to the others.

2. A secondary support truss adapted for joining one end thereof to a primary support truss at an intermediate portion of the primary support truss, said secondary support truss comprising:

an elongated support and a gusset at one end of said elongated support wherein said gusset further comprises a finger portion extending beyond said one end of said elongated support and a tab substantially co-planar with and extending from said finger portion, said finger portion defining at least a portion of a slot, said slot adapted to receive at least one element of the primary support truss for supporting said end of said elongated support thereon without fastening said elongated support to the primary truss, said tab constructed for permanent attachment to an other primary support truss adjacent the primary support truss.

3. A support truss adapted for joining one end thereof to a primary support at an intermediate portion of the primary support, said support truss comprising:

upper and lower chord members defining upper and lower boundaries of said truss;

at least one web member extending between said upper and said lower chord members for supporting said chord members in a fixed relationship, said at least one web member and said upper and lower chord members lying in a generally vertical plane when said support truss is at least partially supported at said one end thereof; and a gusset at one end of said support truss wherein said gusset further comprises a finger portion extending beyond said one end of said support truss, said finger portion being formed at an angle with respect to said support truss for abutting said one end of said support truss to the primary support at an angle other than a right angle, said finger portion further being adapted to hangingly engage the primary support for supporting said end of said support truss thereon without fastening said support truss to the primary truss and further wherein said finger portion lies in a generally vertical plane.

4. A secondary support truss adapted for joining one end thereof to a primary support truss at an intermediate portion of the primary support truss, said secondary support truss comprising:

an elongated support; and a gusset at one end of said elongated support wherein said gusset further comprises a finger portion extending beyond said one end of said elongated support, said finger portion being formed at an angle with respect to said elongated support for abutting said one end of said elongated support to the primary support truss at an angle other than a right angle, said finger portion further being adapted to hangingly engage at least one element of the primary support truss for supporting said end of said secondary support truss thereon without fastening said elongated support to the primary truss wherein said one end of said elongated support and said finger portion define a slot therebetween, said slot adapted to receive at least one element of the primary support truss for supporting said secondary support truss thereon;

said finger portion lying in a generally vertical plane.

5. A secondary support truss as claimed in claim 4 wherein said gusset further comprises a body portion and said finger portion and wherein said body portion is abutted against and fastened to a side of said elongated support at said one end thereof.

6. A secondary support truss as claimed in claim 5 wherein said gusset comprises two said gussets, each of said gussets abutted against and fastened to opposite sides of said elongated support at said one end thereof, said finger portions of said gussets lying in substantially parallel planes relative one to the other.

7. A secondary support truss as claimed in claim 4 further comprising a tab substantially co-planar with and extending from said finger portion and adapted for attaching to an other primary support truss adjacent the primary support truss.

8. A secondary support truss as claimed in claim 2 wherein said slot is defined to receive the at least one element of the primary support truss at a right angle to said finger portion.

9. A support truss adapted for joining one end thereof to a primary support at an intermediate portion of the primary support, said support truss comprising:

upper and lower chord members defining upper and lower boundaries of said truss;

at least one web member extending between said upper and said lower chord members for supporting said chord members in a fixed relationship, said at least one web member and said upper and lower chord members lying in a generally vertical plane when said support truss is at least partially supported at said one end thereof; and two gussets at one end of said support truss, each of said gussets abutted against and fastened to opposite sides of said support truss at said one end thereof, each of said gussets further comprising a finger portion extending beyond said one end of said support truss, each said finger portion of said gussets defining a generally vertical plane substantially parallel one to the other, each said finger portion being adapted to hangingly engage the primary support for supporting said end of said support truss thereon at an abutting angle at substantially right angles thereto without fastening said support truss to the primary support.

10. A support truss as claimed in claim 9 wherein at least one of said gussets further comprises a tab substantially co-planar with and extending from said finger portion, said tab constructed for permanent attachment to an other primary support adjacent the primary support.

11. A support truss as claimed in claim 9, wherein said finger portion defines at least a portion of a slot, said slot adapted to receive a portion of a primary support.

12. A support truss as claimed in claim 11, wherein said gusset further comprises a body portion and said finger portion and wherein said body portion is abutted against and fastened to a side of said support truss at said one end thereof.

13. A truss support system comprising:

a primary support truss including upper and lower chord members defining upper and lower boundaries of said primary support truss and at least one web member extending between said upper and said lower chord members for supporting said chord members in a fixed relationship wherein at least one of said chord members is an elongated channel having a base wall joining generally parallel upstanding side walls; and a secondary support truss including upper and lower chord members defining upper and lower boundaries of said secondary support truss and at least one web member extending between said upper and said lower chord members for supporting said chord members in a fixed relationship and two gussets at one end of said secondary support truss, each of said gussets abutted against and fastened to opposite sides of said secondary support truss at said one end thereof, each of said gussets further comprising a finger portion extending beyond said one end of said secondary support truss, said finger portions of said gussets lying in substantially parallel planes relative one to the other wherein each said finger portion and said end of said secondary support truss defines at least a portion of a slot which receives one of said side walls of said primary support truss without fastening said secondary truss to the primary truss.

* * * * *

UNITED STATES PATENT AND TRADEMARK OFFICE

CERTIFICATE OF CORRECTION

PATENT NO. : 6,076,325
DATED : June 20, 2000
INVENTOR(S) : Scott E. Sluiter

It is certified that error appears in the above-identified patent and that said Letters Patent is hereby corrected as shown below:

Col. 2, line 51;
"t" should be --a--.

Signed and Sealed this

Twenty-second Day of May, 2001

Attest:

NICHOLAS P. GODICI

*Attesting Officer* *Acting Director of the United States Patent and Trademark Office*